Patented July 19, 1949

2,476,802

UNITED STATES PATENT OFFICE 2,476,802

COATING MATERIAL

Walter F. Bollens, Chicago, Ill., assignor to Swift & Company, Chicago, Ill., a corporation of Illinois No Drawing. Application November 22, 1944,
Serial No. 564,725

5 Claims. (Cl. 99—171)

1

In the preparation of paper or fiber containers for holding foods, such as shortening, it is frequently necessary to use edible adhesives or coating material, since in many instances the food product, such as shortening, may contact with these materials. Coatings generally employed for paper or fiber containers are composed of gelatin, sugars, dextrins, starches, etc. However, under certain conditions, these edible coating materials are quite perishable.

An object of this invention, therefore, is to provide a suitable preservative for an edible coating composition, which may be used on fiber or paper containers for shortening or for other foods.

I have found that levulinic acid performs unexpected preservative qualities for coating compositions. In carrying out my invention, I employ a coating composition which may consist, for example, of 50% gelatin and 50% glucose syrup (85%). This mixture is desirably dissolved in water, and thereafter levulinic acid is added thereto and thoroughly admixed therewith. The resulting composition may be used as a sealing compound for the raw edges of the containers or it may be employed to coat the entire containers, as desired.

Levulinic acid has been found to excel all other edible preservatives with which I am familiar. The following is a schedule of comparative tests of levulinic acid, on the one hand, and other known preservatives, on the other:

| Preservative used | Percent of Preservative (Dry Basis) | Mold Growth | | |
|---|---|---|---|---|
| | | 4 Days | 8 Days | 12 Days |
| | Percent | | | |
| None | | Sl. Pos | V. Pos | V. P. |
| Calcium Propionate | 2.0 | Neg | Pos | V. P. |
| Do | 4.0 | Neg | Pos | V. P. |
| Do | 6.0 | Neg | Pos | V. P. |
| Do | 8.0 | Neg | Pos | V. P. |
| Levulinic Acid | 2.0 | Neg | Neg | Pos. |
| Do | 4.0 | Neg | Neg | Pos. |
| Do | 6.0 | Neg | Neg | Neg. |
| Sodium Benzoate | 0.1 | Neg | Pos | V. P. |

From the foregoing test, it will be seen that for ordinary purposes, 2% of the levulinic acid is added, although where greater preservative qualities are desired, the amount, as above indicated, can be increased as desired.

In carrying out the foregoing test, sections were cut from a fiber shortening container and were coated with the various mixtures referred to, were dried and placed in a mold pit having a saturated atmosphere, and held at rooom temperature. The samples were frequently examined for appearance of mold. The results above indicated were then recorded.

Obviously, many modifications and variations of the invention hereinbefore set forth may be made without departing from the spirit and scope thereof, and, therefore, only such limitations should be imposed as are indicated in the appended claims.

I claim:

1. The method of treating fiber containers for holding foods which comprises applying to the surface of the container an edible coating material containing gelatin, a vegetable adhesive and a small amount of levulinic acid as an active ingredient to substantially retard mold growth.

2. The method of treating fiber containers for holding food products which comprises incorporating a small amount of levulinic acid as an active ingredient of a coating composition containing about equal quantities of gelatin and glucose and normally susceptible to mold growth on storage and then applying the edible coating to the surface of the container whereby such mold growth on the surface of the container is substantially retarded.

3. The method substantially as described in claim 2 in which the amount of levulinic acid is about 2% to 6% on a dry basis of the coating composition.

4. The method of packaging food products which comprises packing the product in a fiber container, the surface of said container having been treated with an edible coating composition containing gelatin, a vegetable adhesive and levulinic acid as an active ingredient to substantially retard mold growth.

5. The method of packaging perishable food products which comprises packing the product in a fiber container and then sealing the container with an edible mixture of gelatin and glucose containing levulinic acid as an active ingredient to substantially retard mold formation.

WALTER F. BOLLENS.

REFERENCES CITED

The following references are of record in the file of this patent:

UNITED STATES PATENTS

| Number | Name | Date |
|---|---|---|
| 1,048,674 | Fitzgerald | Dec. 31, 1912 |
| 2,071,625 | Haas | Feb. 23, 1937 |
| 2,154,449 | Hoffman et al. | Apr. 18, 1939 |
| 2,271,756 | Bauer et al. | Feb. 3, 1942 |

FOREIGN PATENTS

| Number | Country | Date |
|---|---|---|
| 120,786 | Germany | June 6, 1889 |

OTHER REFERENCES

Chemical Abstracts, vol. 32, 1938, 1739[4]; Sterilizing Action of Acids; X. Sterilizing action of aldehydic and ketonic acids and aconitic acid, Tetsumoto.